United States Patent Office 3,471,301
Patented Oct. 7, 1969

3,471,301
DESSERT-ON-THE-STICK
William A. Mitchell, Lincoln Park, N.J., and Robert E. Klose, Bronx, N.Y., assignors to General Foods Corporation, White Plains, N.Y., a corporation of Delaware
No Drawing. Filed Oct. 26, 1966, Ser. No. 589,491
Int. Cl. A23g 5/00, 3/00
U.S. Cl. 99—139                                                          8 Claims

ABSTRACT OF THE DISCLOSURE

A dessert product that is made from a powdered dessert mix containing, as the essential ingredients, starch and gelatin, which are co-dried by the drum drying method. The powdered product is then dissolved in cold milk or water and permitted to stand for about two to five minutes in moulds, after which time it is firm enough to be removed and either consumed as is, stored under refrigeration or frozen.

Background of the invention

At present the commercially available frozen confection products consist for the most part of frozen water ice and coated ice cream. While these products have been widely accepted they suffer from several disadvantages. One major disadvantage is that the product must be eaten in the frozen state; otherwise, it will not remain firmly attached to the stick. This characteristic makes the product somewhat undesirable as a treat for young children who invariably prolong the consumption of it until it falls off the stick and onto their clothing, a rug, etc.

Various food combinations have been explored in search of a dessert-type product that is not, to any great extent, thermo-sensitive. Attempts have been made to prepare such a product using gelatin. However, the resulting preparation, when prepared with cold milk or water, swells slowly and yields a product having a rubbery, grainy texture which does not dissolve easily in the mouth. Dessert-on-a-stick products have also been made using starch but these products are likewise inferior in that they have poor gelling characteristics and a slimy texture. Neither gelatin nor starch has been successfully used in preparing a commercially acceptable dairy based dessert-on-a-stick product. Attempts have also been made to prepare a cold water-soluble pudding mix from a mixture of starch and gelatin which has the desirable characteristics of each but the resulting product is grainy and unacceptable because neither the starch nor the gelatin dissolve properly in the cold water or milk.

Advantages and objects

A pudding mix has now been prepared from a mixture of starch and gelatin in which all of the desirable properties of starch and gelatin are retained. The pudding mix, when added to a limited quantity of cold water or milk, forms a product which has a smooth texture such as that normally associated with fine starch puddings, and the firmness of gelatin-based food compositions. On the other hand this new pudding does not have the undesirable qualities noted above, such as sliminess, graininess and rubbery texture. Furthermore, the pudding prepared according to the invention is relatively insensitive to heat and will not melt upon standing at room temperature. Due to these desirable attributes the pudding is ideal for preparing chilled snacks, such as those mounted on sticks, because the pudding has a tendency to remain firmly attached to the stick. Thus, when young children are eating the chilled snack there is very little danger of its falling off the stick and causing a sticky mess. A further advantage of the non-thermo-sensitivity of the product is that it can be eaten either at room temperature or chilled, whichever is desired.

The product of the instant invention is much easier to make than the usual frozen type stick mounted products since it can be prepared by simply mixing the ingredients in cold water or milk, preparing the so-prepared pudding into the desired molds containing sticks and allowing the molds to stand for a short time. There is no necessity to cook the dessert prior to setting.

Accordingly, it is the object of the present invention to provide a new dessert snack that can be easily prepared in the home. It is a second object to provide a dessert product that can be eaten either in the chilled state or at room temperature. It is another object of the invention to provide a dessert product than can be packaged in bar-form or mounted on a stick and packaged as a dessert on a stick. It is a fourth object to provide a dessert-on-a-stick product that will remain firmly attached to the stick while it is being eaten without regard to its temperature. It is a still further object to provide a starch-gelatin based dessert-on-a-stick product which has a firm, stable pudding-like texture and which will not undergo syneresis. These and other objects of the invention will become apparent from the following description and example.

Description of invention

The product of the present invention comprises as the main ingredient a co-dried mixture of starch and gelatin. It is important that the starch-gelatin mixture be co-dried so that the desirable gelling properties of each of these ingredients will be retained. Although any known drying method can be used, the preferred drying method is drum drying since this yields a product which uniformly dissolves in cold aqueous liquid to give a smooth gel. The method of preparing the co-dried starch-gelatin mixture is disclosed in German Patent 1,151,168, published June 4, 1963.

Any suitable starch can be used in preparing the co-dried starch-gelatin mixture such as potato, tapioca, wheat, corn, waxy maize or sorghum. The starch content in the starch-gelatin mixture can vary from 40 to 80%, but in the preferred embodiment the amount is about 50%, i.e. the starch-gelatin ratio is preferably about 1:1. The gelatin used can be either type A or B and can have a Bloom range of 100 to 300. In preparing the starch-gelatin mixture the starch and gelatin are uniformly blended. An aqueous slurry of the starch-gelatin blend is next prepared containing 15 to 30%, preferably 20%, solids. The starch-gelatin slurry is then pregelatinized and dried as by passing it through heated drum rolls. The product obtained is ground so that its particle size lies between 100 and 225 mesh (U.S. Standard), preferably about 200 mesh.

The dessert formulation used in preparing the products of this invention consists of the above starch-gelatin mixture, a sweetening agent, salt, and flavoring ingredients. An artificial sweetening agent can be substituted for the sugar if a low calorie dessert is desired, although sugar is the preferred sweetener because it promotes dispersion and dissolution of the powdered mix in the aqueous liquid. The change in solids content does not have to be accounted for when substituting the artificial sweetener for sugar since the sugar does not appreciably affect the viscosity of the final product. Any of the common artificial sweetening agents can be used in the invention, such as the sodium and calcium salts of saccharin or cyclamate.

In preparing the dessert snacks the powdered mixture is dissolved in a sold aqueous solution, such as water or milk, poured into moulds having the shape of the desired product configuration, and permitted to set for a period of from two to five minutes. After the setting period the products, which are now firm, can be removed from the moulds and can be immediately consumed or stored under refrigeration for later use.

In general the dessert snack will contain about five to 30 parts by weight of starch-gelatin base mixture and 15 to 50 parts by weight of sugar per one hundred parts by weight of milk.

Although the pudding is prepared in the same manner as ordinary dessert puddings, its qualities differ considerably from dessert puddings. Dessert puddings are usually soft and spoonable, whereas the instant product is firm and of such consistency that it will not fall off a stick when prepared according to the invention. This is due to the combined gelling effect of the gelatin and starch and also to the fact that there is considerably less liquid used in preparing this product than is ordinarily used in preparing puddings.

In order that the invention can be better understood the following example will serve to illustrate specific applications of the invention.

Example I

A starch-gel co-dried mixture containing 50% starch and 50% gelatin was prepared in the following manner.

10% solution of 200 Bloom gelatin was made by dissolving the gelatin in hot water. Raw potato starch was suspended in cold tap water in an amount sufficient to make a 20% solution. The two solutions were mixed and the resulting mixture dried at atmospheric pressure on a double roll drum dryer and heated by means of 60 p.s.i.g. steam pressure. The dried material was ground in a Waring blender and sieved, yielding a 200 mesh particle size.

The following dessert formulation was prepared using the above co-dried starch-gelatin mixture.

| | G. |
|---|---|
| Co-dried starch and gelatin | 17.0 |
| Sugar | 30.0 |
| Color | 0.1 |
| Flavor | 0.5 |
| Wesson Oil | 0.2 |

A dessert-on-a-stick was made by the following procedure. The above dessert mix was added to 100 cc. of milk at 6° C. in a bowl of a Mixmaster and mixed therein for about 1 minute. The resulting pudding was poured into a small plastic pouch from which extended a stick such as is used for holding frozen ice cream. The mix was allowed to stand for five minutes after which the product was removed from the pouch. The product was a firm gelled dessert snack having a smooth texture which could be carried on the stick and eaten in the same manner as ice cream on a stick.

Although the present invention has been described with particular reference to a specific example it should be understood that the invention is not limited thereto, and, therefore, reference should be had to the appended claims for definition of the limits of the invention.

What is claimed is:
1. A self-supporting milk-containing gelled dessert snack comprised of 5 to 30 parts by weight of starch-gelatin base mixture and 15 to 50 parts by weight of sugar per 100 parts by weight of milk, wherein said starch-gelatin base contains about 40 to 80% starch and is prepared by drum drying an aqueous dispersion comprising starch and gelatin.

2. A product according to claim 1 wherein said starch-gelatin base contains about 50% starch.

3. A product according to claim 2 wherein the starch is potato starch.

4. The product of claim 1 wherein said dessert snack is frozen.

5. The product of claim 1 wherein said dessert snack is mounted on a stick.

6. The product of claim 1 wherein said dessert snack is coated with a sugar-containing material.

7. A self-supporting gelled water-containing dessert snack comprised of 5 to 30 parts by weight of starch-gelatin base mixture and 15 to 50 parts by weight of sugar per 100 parts by weight of water, wherein said starch-gelatin base contains about 40 to 80% starch and is prepared by drum drying an aqueous dispersion comprising starch and gelatin.

8. A dessert snack comprising:

| | Parts by weight |
|---|---|
| Starch-gelatin base mixture | 10–15 |
| Sugar | 25–35 |
| Milk | 100 | wherein the starch-gelatin base mixture contains about 50% potato starch and is prepared by drum-drying an aqueous dispersion comprised of starch and gelatin.

References Cited

UNITED STATES PATENTS

| 2,217,700 | 10/1940 | Musher | 99—137 |
| 2,824,092 | 2/1958 | Thompson | 252—316 XR |

FOREIGN PATENTS

| 1,151,168 | 7/1963 | Germany. |

RAYMOND N. JONES, Primary Examiner

J. M. HUNTER, Assistant Examiner

U.S. Cl. X.R.
99—130, 136, 137